Oct. 18, 1966

R. B. BADGETT 3,279,665

TAPE PULLER

Filed Jan. 27, 1965

2 Sheets-Sheet 1

INVENTOR
ROGER B. BADGETT

BY R. C. Terry
ATTORNEY

United States Patent Office 3,279,665

Patented Oct. 18, 1966

3,279,665

TAPE PULLER

Roger B. Badgett, Northlake, Ill., assignor to Teletype Corporation, Skokie, Ill., a corporation of Delaware Filed Jan. 27, 1965, Ser. No. 428,346
6 Claims. (Cl. 226—25)

This invention relates to tape pullers and more particularly to tape pullers for supplying tape to printing telegraph mechanisms.

Recent developments in the telegraph industry have made it necessary to supply the tape preparation and utilization devices used in that industry with larger supplies of paper tape. This tape is customarily stored on rolls and as these rolls have become larger it has become impractical to unwind tape from them by use of the tape advancing mechanisms of the tape preparation and utilization devices alone. Accordingly, tape pullers have been employed in conjunction with tape preparation and utilization devices for aiding the tape advancing mechanisms of those devices in unwinding tape from tape supply rolls. These tape pullers must be able to quickly and positively respond to the tape requirements of high speed tape preparation and utilization devices without tearing the tape by applying large forces to the high inertia tape supply rolls.

Accordingly, an object of this invention is to provide a tape puller which quickly and positively responds to demands for tape.

Another object of this invention is to provide a tape puller which does not apply excess forces to the tape being pulled.

A further object of this invention is to provide a tape puller for use in conjunction with high speed tape preparation and utilization devices which quickly responds to the tape requirements of those devices without tearing the tape being supplied.

According to the preferred embodiment of this invention a triangularly shaped support member is pivotally attached adjacent to one of its vertices on a frame which also supports a roll or coil of tape to be unwound. A spring urges the support member to pivot in one direction about the frame, however, its motion in this direction is limited by a pin on the support member which interacts with an edge on the frame. Mounted at another vertex of the triangularly shaped support member is a drive roller which is constantly rotated by a motor. Pivotally mounted at the third vertex of the support member is a support arm upon which is mounted a tape driving pulley. A spring biases the support arm and therefore the tape driving pulley away from the drive roller. As the tape is unwound from the coil, its leading edge extends over the tape driving pulley so that when the tension in the tape becomes too great the tape driving pulley is brought into engagement with the drive roller thereby rotating the tape driving pulley and advancing the tape. This action decreases the tension in the tape, however, should the tension in the tape build up so rapidly that it cannot be relieved in this manner the driving pulley, the support arm, the drive roller and the support member all pivot about the frame thereby providing an instantaneous tension release.

A more complete understanding of this invention may be had by referring to the following detailed description when considered in conjunction with the drawings wherein.

Figure 1:
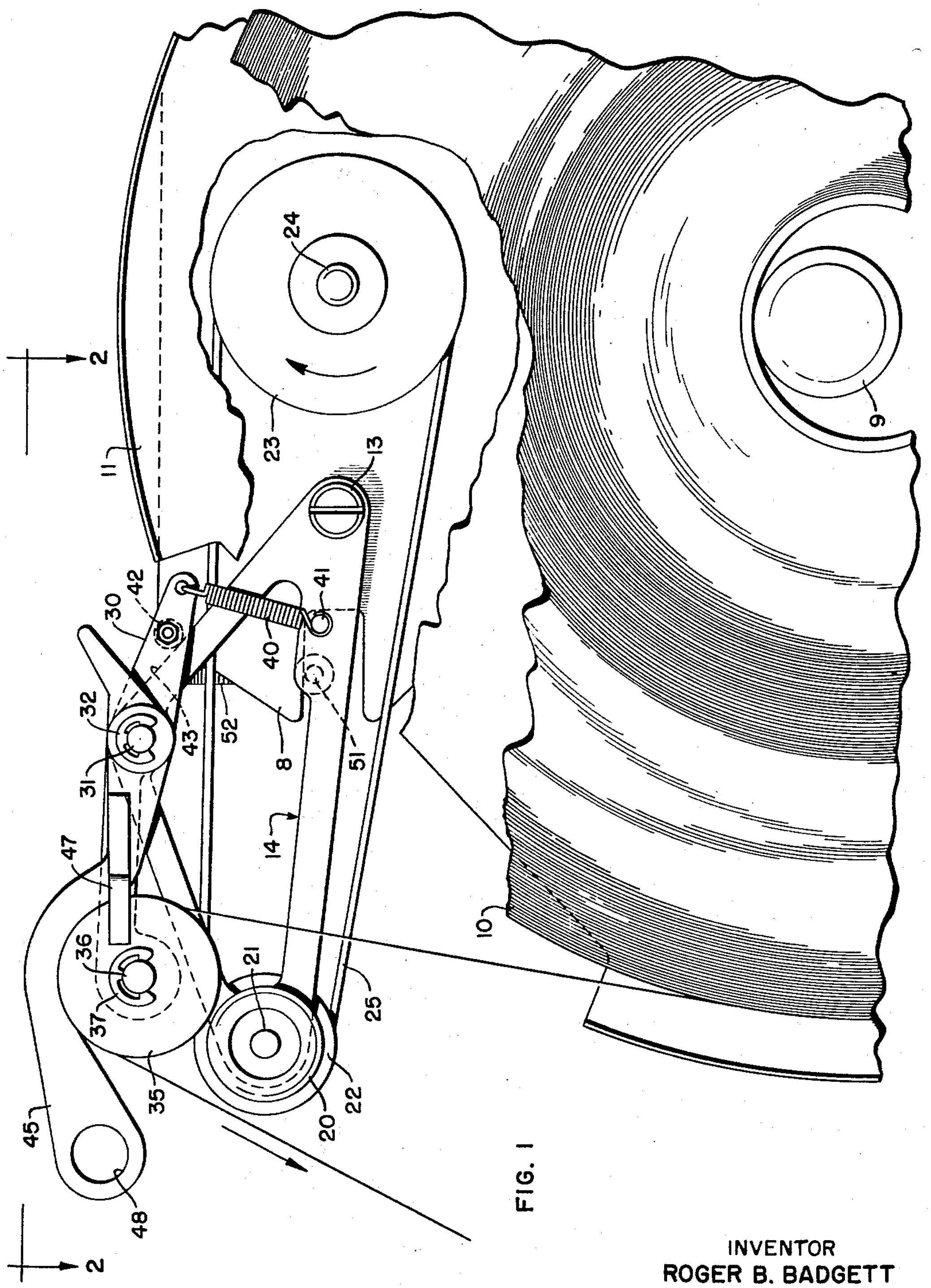
FIG. 1 is a front view of the preferred embodiment of the invention in which parts have been broken away more clearly to illustrate certain features of the device.

Referring now to the drawings wherein like reference numerals represent like parts throughout the several views there may be seen a frame 8 to which there is fixed a post 9 for supporting a roll or coil of tape 10 to be unwound. A pair of guide plates 11 and 12 are provided for positioning the roll of tape 10 on the post 9 and for guiding the tape as it leaves the roll. Pivotally mounted on the frame 8 by means of a pivot stud 13 is a triangularly shaped support member 14. As may be best seen in FIGS. 2 and 3 the pivot stud 13 is adjustably mounted on the frame 8 by means of a threaded pin 15 and a slot 16 in the frame 8 so that the triangularly shaped support member 14 is laterally movable with respect to the frame. The support member 14 is, however, pivotable with respect to the frame 8 regardless of the position of the pin 15 in the slot 16.

Figure 3:
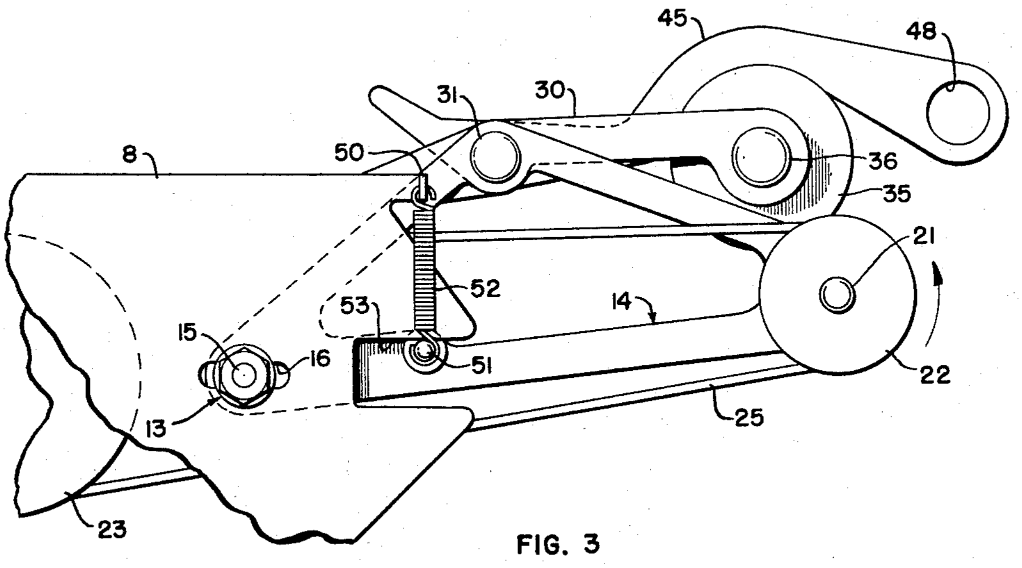
FIG. 3 is a rear view thereof.

Referring again to FIG. 1 it may be seen that the triangularly shaped support member 14 is pivotally attached to the frame 8 at one of its vertices. At a second of its vertices the support member 14 rotatably supports a drive roller 20. This drive roller 20 is fixed to a shaft 21 which is suitably journalled in the support member 14. As is shown in FIG. 3 there is also attached to the shaft 21 a pulley 22 which is used to supply rotary motion to the drive roller 20. Mounted on the frame 8 to the right (FIG. 1) of the pivot stud 13 is a second pulley 23 which is driven through a shaft 24 by a motor (not shown). A V-belt 25 is mounted between the pulleys 22 and 23 so that as the pulley 23 is rotated by the motor, the pulley 22 is also rotated. In normal operation of the device the motor (not shown) is constantly operated and, therefore, the drive roller 20 is normally continuously rotated. As may be best seen in FIG. 3 the tension in the V-belt 25 may be regulated by adjusting the position of the pin 15 in the slot 16.

Pivotally mounted at the third vertex of the triangularly shaped support member 14 is a support arm 30. The support arm 30 is oscillatably mounted on the support member 14 by means of a stud shaft 31 and is secured on the shaft by means of snap ring 32. Mounted at the left end (FIG. 1) of the support arm 30 is a tape driving pulley 35. This tape driving pulley is rotatably mounted on the support member 30 by means of a shaft 36 and is secured on the shaft 36 by a snap ring 37. A spring 40 is attached to the right end of the support arm 30 and is anchored to a post 41 on the support member 14 so that it urges the support member 30 and, therefore, the tape driving pulley 35 to rock clockwise about the shaft 30. Clockwise motion of the support arm 30 is limited, however, by an eccentric screw 42 which is attached to the support arm 30 and which bears against an edge 43 of the support member 41.

Figure 2:
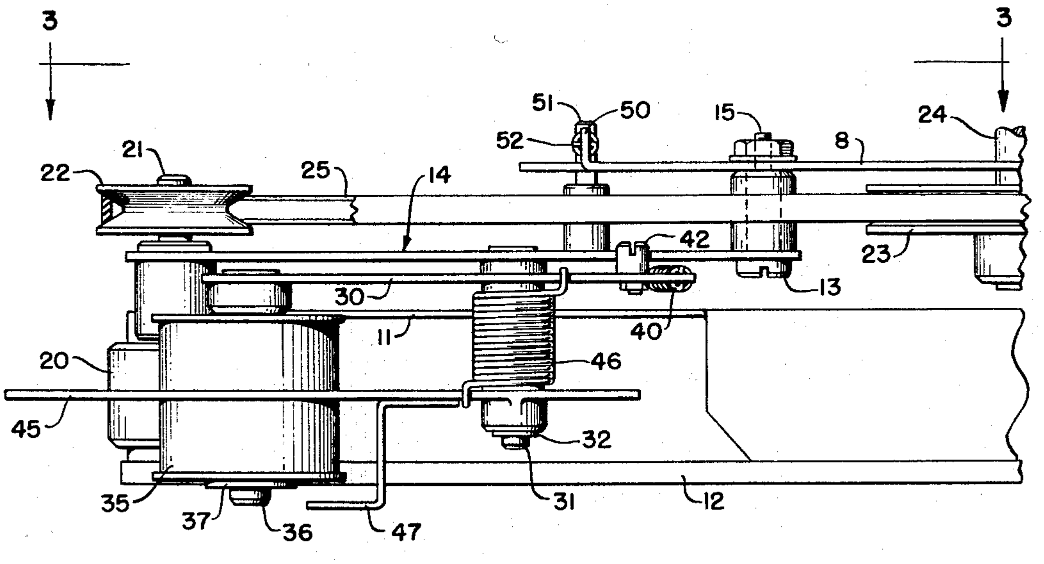
FIG. 2 is a top view of the device.

Also pivotally mounted on the shaft 31 is a tape restraining member 45. This tape restraining member is urged by a spring 46 into engagement with the tape driving pulley 35 and is mounted on the shaft 31 so that its mid portion engages the upper surface of the tape on the tape driving pulley 35. A tape trapping bracket 47 is attached to the tape restraining member 45 so that it extends past the edge of the tape driving pulley 35 on its forward side (FIG. 2). A finger hole 48 is provided in the free end of the restraining member 45 which may be used to grasp the restraining member 45. The member 45 may then be pivoted about the shaft 31 against the action of the spring 46 so that the tape to be unwound may be more easily inserted in the device.

Referring now to FIG. 3 it will be seen that a spring 52 is secured between a tab 50 on the frame 8 and a post 51 on the support member 14. This spring urges the support member 14 to rock counterclockwise (FIG. 3) about the pivot stud 13. The motion of the support member 14 is limited by the post 51 which engages an edge 53 on the frame 8.

In operation, the tape restraining member 45 is raised and the leading edge of the coil of tape 10 is drawn over the tape driving pulley 35. The tape restraining member 45 is then lowered into engagement with the upper surface of the tape thereby forcing the lower surface of the tape into frictional engagement with the pulley 35. The tape is prevented from escaping from the pulley 35 by the tape entrapping bracket 47 which blocks the tape from coming off the forward edge of the pulley and by the tape support arm 30 which blocks the tape from coming off the rearward edge of the pulley (FIG. 2). From the pulley 35 the tape is advanced to a tape preparation or utilization device (not shown). This device may be of a high speed character and, therefore, will require that tape be fed to it very rapidly and quickly. When the tape preparation or utilization device exerts a force on the leading edge of the tape this force will be transmitted back to the coil of tape 10. However, since the coil of tape 10 will have a high inertia it will resist rotating about the post 9. Therefore, the demand for tape by the tape preparation or utilization device and the resistance to rotation by the coil of tape 10 will result in a high tension in the length of tape which lies between the tape preparation or utilization device and the coil of tape 10. This high tension will exert a downward force on the tape driving pulley 35 and will, therefore, cause the pulley 35 and the support arm 30 to be rocked about the post 31 against the action of the spring 40. This will bring the tape driving pulley 35 into frictional engagement with the drive roller 20 which is being continuously rotated by a motor (not shown) through the pulley 23, the V-belt 25, and the pulley 22. As soon as the tape driving pulley 35 comes into frictional engagement with the drive roller 20 it will be rotated thereby and thus will tend to advance the tape which is being held in frictional engagement with the pulley 35 by the tape restraining member 45. Thus, a steady, even pull will be exerted on the tape in response to a demand for tape by the tape preparation or utilization device. This pull will be transferred back to the coil of tape 10 and will cause the coil of tape 10 to rotate about the post 9. Once the coil of tape 10 has started to rotate about the post 9 the inertia will cause it to continue to rotate and hence a lengh of slack tape will develop between a coil of tape 10 and the tape drive pulley 35. The slack in the portion of the tape will relieve the force which is applied to the tape driving pulley 35 and thus will allow the spring 40 to rock the support arm 30 and the tape driving pulley 35 about the post 31, thus moving the tape driving pulley 35 out of engagement with the drive roller 20 and stopping the advancement of the tape. Since a slack section of tape is built up between the roll of tape 10 and the tape driving pulley 35 a new demand for tape by the tape preparation or utilization device will not result in tension in the tape but instead will result in a feeding out of the slack portion under the action of the tape advancing mechanism of the tape preparation or utilization device alone. After the slack has been taken up, however, further demand for tape on the part of the tape preparation or utilization device will result in the above outlined operation being repeated.

It is possible that initial demands for tape come in such rapid succession or that the inertia of the coil of tape is so high that the operation just previously outlined will not be adequate to relieve the tension in the section of tape which lies between the tape preparation or utilization device and the coil of tape 10. In this case the support arm 30 and the tape driving pulley 35 will be pivoted about the shaft 31 against the action of the spring 40 in the manner just described. In addition to this, the triangularly shaped support member 14, the drive roller 20, the tape advancing pulley 35 and the support arm 30 will all pivot about the pivot stud 13 against the action of the spring 52. The direction of this pivoting is in the direction of the advancement of the tape to the tape preparation or utilization device and thus, such pivoting will tend to relieve the excessive tension in the tape.

The tensions in the spring 40 and in the spring 52 are such that much less tension is required in the tape to cause the support arm 30 to pivot about the shaft 31 than is required to cause the triangularly shaped support member 14 to rock about the pivot stud 13. In addition to this, the peripheral speed of the tape pulley 35 is somewhat greater than the maximum contemplated speed of the tape preparation or utilization device. Accordingly, in normal operation a pivoting of the support arm 30 about the shaft 31 coupled with a tape advancement by the tape driving pulley 35 is enough to relieve any excess tension in the tape. However, should a combination of an extreme demand for tape by the tape preparation or utilization device be coupled with the presence of a coil of tape 12 which has a relatively high inertia then a pivoting of the support member 14 about the pivot 13 will occur, thus preventing a tearing of the tape.

Although only one embodiment of the invention is shown in the drawings and described in the foregoing specification, it will be understood that invention is not limited to the specific embodiment described, but is capable of modification and rearrangement and substitution of parts and elements without departing from the spirit of the invention.

What is claimed is:

1. A tension responsive device for unwinding tape from a roll including:

tape advancing means over which the tape passes as it leaves the roll;

drive means normally out of engagement with the tape advancing means for rotating the tape advancing means;

first support means for supporting the drive means and for moving the drive means in a direction which tends to decrease the tension in the tape when said tension exceeds a first predetermined level; and second support means mounted on the first support means for supporting the tape advancing means and for moving the tape advancing means into engagement with the drive means when the tension in the tape being unwound exceeds a second predetermined level.

2. A tension responsive device for unwinding tape from a roll including:

a tape driving pulley over which the tape passes as it leaves the roll;

a constantly rotating drive roller normally out of frictional engagement with the tape driving pulley for rotating the tape driving pulley;

first means responsive to the tension of the tape being unwound for moving the tape driving pulley into frictional engagement with the drive roller when said tension exceeds a first predetermined level thereby causing the driving pulley to be rotated and tape to be unwound from the coil; and second means responsive to the tension of the tape being unwound for moving the driving pulley, the drive roller and the first means in a predetermined direction when said tension exceeds a second predetermined level thereby causing the tension in the tape to be reduced.

3. A tape unwinding device including:

a frame for supporting a roll of tape to be unwound;

a support member oscillatably mounted on the frame;

a constantly rotating drive roller mounted on the support member;

a support arm pivotally mounted on the support member for rocking movement with respect thereto;

a tape driving pulley mounted adjacent to the free end of the support arm for rocking movement into frictional engagement with the drive roller; and means for directing the tape from the roll of tape over the driving pulley whereby when the tension in the tape being unwound exceeds a first predetermined level the tape driving pulley will be moved into driving engagement with the drive roller and when the tension in the tape exceeds a second predetermined level the support member, the drive roller, the support arm and the driving pulley will move with respect to the frame in a direction which tends to lessen the tension in the tape.

4. A tension responsive device for unwinding tape from a roll including:

a frame;

a support member mounted on the frame and responsive to the tension in the tape being unwound for movement in a direction which tends to lessen the tension in the tape when said tension in the tape exceeds a first predetermined level;

a support arm mounted on the support member and responsive to the tension in the tape for movement in a predetermined direction when the tension in the tape exceeds a second predetermined level;

tape advancing means mounted on the support arm over which the tape passes as it leaves the roll; and drive means mounted on the support member and normally out of engagement with the tape advancing means for rotating the tape advancing means, the tape advancing means being mounted on the support arm so that when the support arm moves in said predetermined direction in response to said second predetermined level of tension in the tape advancing means is brought into driving engagement with the drive means and the support arm and the drive means being mounted on the support member so that when the support member moves in said direction which tends to lessen the tension in the tape in response to said first predetermined level of tension in the tape the support arm, the tape advancing means and the drive means also move in said direction which tends to reduce the tension in the tape.

5 A tape unwinding device comprising:

a frame;

a support member pivotally mounted on the frame for rocking movement with respect thereto;

a first spring for urging the support member to rock in a predetermined direction with respect to the frame;

blocking means for limiting the movement of the support member in said predetermined direction;

a drive roller mounted on the support member;

means for constantly rotating the drive roller;

a support arm mounted on the support member for rocking motion with respect thereto;

a second spring for urging the support arm to rock in a a predetermined direction with respect to the support member;

blocking means for limiting the movement of the support arm, with respect to the support member in said predetermined direction; and a tape driving pulley over which the tape passes as it is being unwound for movement against the action of the second spring into frictional engagement with the drive roller, thereby to be rotated by the drive roller, when the tension in the tape exceeds a first predetermined level and for movement with the second spring, the support arm, the drive roller and the support member against the action of the first spring when the tension in the tape exceeds a second predetermined level thereby preventing the tension in the tape from exceeding said second predetermined level.

6. A tape unwinding device comprising:

a frame having at least one edge;

a triangularly shaped support member pivotally mounted on the frame at one of its vertices for rocking movement with respect to the frame;

a first spring for urging the support member to rock in a predetermined direction with respect to the frame;

a pin on the support member for engaging an edge on the frame to limit the movement of the support member in said predetermined direction;

a drive roller mounted on the support member at a second of its vertices;

means for constantly rotating the drive roller;

a support arm mounted on the support member at the third of its vertices for rocking motion with respect thereto;

a second spring for urging the support arm to rock in a predetermined direction with respect to the support member;

a pin on the support arm for engaging one side of the support member to limit the movement of the support arm in said predetermined direction; and a tape driving pulley over which the tape passes as it is being unwound for movement against the action of the second spring into frictional engagement with the drive roller, thereby to be rotated by the drive roller, when the tension in the tape exceeds a first predetermined level and for movement with the second spring, the support arm, the drive roller and the support member against the action of the first spring when the tension in the tape exceeds a second predetermined level thereby preventing the tension in the tape from exceeding said second predetermined level.

References Cited by the Examiner

UNITED STATES PATENTS

| | | | |
|---|---|---|---|
| 1,913,087 | 6/1933 | Oehmichen | 226—188 X |
| 2,838,304 | 6/1958 | Berkenhoff | 226—36 |

References Cited by the Applicant

UNITED STATES PATENTS

| | | |
|---|---|---|
| 1,981,229 | 11/1934 | Gillet. |
| 2,153,552 | 4/1939 | Eitzen. |
| 2,488,339 | 11/1949 | Shields. |
| 2,491,228 | 12/1949 | Swift. |

ROBERT B. REEVES, *Primary Examiner.*

HADD S. LANE, *Examiner.*